United States Patent [19]

Wolf

[11] 4,326,642

[45] Apr. 27, 1982

[54] TUBULAR CASE SEALING MEANS AND METHOD OF MANUFACTURING SAME

[75] Inventor: Franz-Josef Wolf, Bad Soden-Salmunster, Fed. Rep. of Germany

[73] Assignee: WOCO Franz-Josef Wolf & Co., Bad Soden-Salmunster, Fed. Rep. of Germany

[21] Appl. No.: 207,936

[22] Filed: Nov. 18, 1980

[30] Foreign Application Priority Data

Nov. 19, 1979 [DE] Fed. Rep. of Germany ....... 2946578

[51] Int. Cl.³ ..................... B65D 35/44; B65D 43/00; B65D 51/00
[52] U.S. Cl. .......................... 220/200; 220/DIG. 19; 174/52 S; 361/433
[58] Field of Search ...................... 220/200, DIG. 19; 174/52 S, 52 FP; 429/54

[56] References Cited

U.S. PATENT DOCUMENTS

| | | | |
|---|---|---|---|
| 4,004,199 | 1/1977 | Pearce et al. | 361/433 |
| 4,148,408 | 4/1979 | Wolf | 220/200 |
| 4,192,433 | 3/1980 | Hascoe | 174/525 |

Primary Examiner—George T. Hall
Attorney, Agent, or Firm—Finnegan, Henderson, Farabow, Garrett and Dunner

[57] ABSTRACT

A sealing mechanism and method for closing the case of an electrical component including a metal disk and an elastomer part wherein the elastomer part as measured from the inside of the metal disk is at least twice as thick in the axial direction as the metal disk, and, prior to assembly, the elastomer part covers and surrounds the radial outer rim and at least the peripheral rim region of the outside of the metal disk axially opposite to the inside of the case.

5 Claims, 2 Drawing Figures

TUBULAR CASE SEALING MEANS AND METHOD OF MANUFACTURING SAME

BACKGROUND OF THE INVENTION

I. Field of the Invention

The invention relates to a sealing means for a casing of an electronic component. Preferably, the invention concerns sealing means for a capacitor tubular case.

The invention furthermore relates to a method for manufacturing such a sealing means.

II. Description of the Prior Art

It is known to seal tubular cases for electric capacitors either by elastomer plugs (German Pat. No. 23 09 492 A1) or by disks (German Pat. Nos. 23 07 068 A1; 27 18 228 A1). Regarding tubular cases of small diameters, the more economical and simpler, more reliable and better sealing plugs are used, while tubular cases of large diameters require the more expensive and as concerns sealing more critical disks, which on the other hand are more stable dimensionally.

Because of their relative large elastomer mass, the elastomer plugs offer a non-critical, good high deformability, that is, they provide high return forces and, therefore, will seal reliably. As a rule the tubular case is sealed by rolled-in pleats and/or by rimming and bending, and by the deformations in the elastomer plug so caused.

The relatively high permeability of elastomers with respect to liquids sealed in the tubular case is critical in the known plugs, these liquids being in particular electrolytes and dielectrics. In the early days of the plug technology, the plug material used were elastomers crosslinked with sulfur. It was found, however, that such sulfur-crosslinked elastomers in the course of time discharged sulfur into the capacitor liquid, whereby capacitor life ended prematurely. As a result, peroxidically crosslinking elastomers, especially EPDM, have been used as plug material. In the meantime it was found, however, that the permeability, especially of EPDM, is inadmissibly high.

Even for relatively thick plug designs, the liquid sealed in the tubular case in time will permeate the plug material and reach its outer surface. The liquid discharging at the outer surface evaporates, whereby constant evaporation of the liquid sealed in the tubular case takes place through the plug. This permeability is so high that modern sealing technology has gone back to plug materials which can crosslink, not with peroxides but only with sulfur. In particular, butyl rubber is being increasingly used as a material for elastomer plugs. However, while butyl rubber evinces only a relatively low permeability, though larger than null, it also suffers from the substantial drawback that it is difficult to work. Furthermore, butyl rubber cannot be peroxidically crosslinked, rather it must be subjected to a chemically undesired sulfur crosslinking, for instance with mercaptans or thiurams, or to process-technically disadvantageous resin crosslinking, for instance with coumarone resins.

Both the high permeability of EPDM and the difficult workability, plus any possible sulfur content of butyl rubber, prevent using elastomer plugs to seal tubular cases of substantial diameters. Furthermore, problems of dimensional stability prevent using such plugs on merely mechanical considerations.

Accordingly, dimensionally stable disks made from rigid materials such as plastics, molded substances or metals are used to seal large-diameter tubular cases. Particularly as regards economical manufacture and good temperature resistance, metal sealing disks, especially made of aluminum, have been found practical in recent times. The gas-tight and liquid-tight sealing between such aluminum disks and the rim of the tubular case, also consisting most of the time of aluminum, is implemented by an elastomer which most of the time also is used for electrically insulating the metal sealing disk from the tubular case. The elastomer is designed in the form of a relatively thin foil which is bonded, vulcanized or riveted to the inside of the metal sealing disk that faces toward the inside of the tubular case. The diameter of the circular elastomer foil exceeds the diameter of the metal disk, so that the elastomer disk—when the sealing disk is inserted into the aperture of the tubular case—bends over and around the metal disk onto its outside by its projecting rim area. In the ensuing deformation of the rim of the tubular case, the elastomer foil between the rim of the tubular case and the rim of the metal disk is deformed so as to seal (German Pat. No. 23 07 068 A1). The electrical feedthroughs are designed in the manner of rivets, the one head of which rests on the inside of the elastomer foil and the other head on the outside of the metal disk.

In this known method of disk sealing using metal disks, there is a drawback in that the relatively thin elastomer foil can lead to leakages either by being pleated or by being torn when the capacitor is being sealed. If the elastomer foil is made thicker so as to prevent tearing, there is an increased tendency for material buckling, thereby forming canals which prevent a possible tight sealing of the tubular case. If the foil is made thinner to prevent canal formation, there is again the tendency to tear. Useful results by using intermediary values for foil thickness can be obtained, but they are not wholly satisfactory in all respects.

A better solution for sealing between the metal disk and the tubular case of the capacitor is the sealing disk known from German Pat. No. 27 18 228 A1. As regards this sealing disk, the rubber sealing element is injectionextrusion coated on the upper, lower and radial outer sides of the metal disk rim. This permits reinforcing the rim-rubberizing of the metal disk without incurring stress. This reinforcement, however, is restricted, and in the course of sealing the tubular case and radially pressing against the tubular case wall, the rubber may be detached from the metal disk and, hence, leakage channels may be generated. Also, the rim-rubberized disk cannot be equipped with insulated electric feedthroughs.

In view of this state of the art, it is the object of the present invention to create a sealing means of the initially cited kind which shall be impermeable, dimensionally stable and problem-free in engineering, as these terms are explained above, and which simultaneously shall behave reliably and be noncritically sealing when the tubular case is being closed.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

The above mentioned problems are solved by a sealing means of the initially cited kind, which pursuant to the invention, includes the features recited in the appended claims. The basic concept of the invention is to solidly join a conventional plug on its outwardly face—with respect to the tubular case—with a metal disk, thus forming an almost integral junction element, and to so design the plug in the region of this metal disk that it will reach around the outer rim of said metal disk. The solid junction between the metal disk and plug elastomer can be implemented by bonding, vulcanization of the elastomer or also, if desired, by fusing or welding. A required undetachably fastened and preferably gas and liquid tight areal junction must exist between the metal disk and the elastomer part of the sealing means of the invention, so that a junction element handled as a unit, namely the sealing means, shall be obtained.

According to the requirements of the invention, the sealing means will be used preferably in such a manner that after the sealing means is inserted into the tubular case, a pleat will be rolled underneath the metal disk into the case wall and will elastically and radially compress the elastomer part in the manner of conventional plug sealing. On account of at least this one pleat, the tubular case will be rendered easily and simple gas and liquid tight, and it is then tightly and reliably closed as with a plug. Thereupon the projecting rim of the tubular case is bent around inward in a conventional manner, the elastomer ring section surrounding the radial outer rim of the metal disk being simultaneously compressed.

However, in the invention's sealing means, the sealing means only fills the object of an additional hermetizing part, not, as in the known sealing disk, that of the single, main hermetizing part. Because of the solid junction between the metal disk and the elastomer, practically no liquid enclosed in the case can evaporate at the outside of the plug even if it were to permeate the plug material, as the outside is blocked by the metal disk. The only available permeable and evaporating paths are the small ring about the outside rim of the disk, and the small ring about the feedthrough apertures in the disk. The outside path around the disk rim is almost nearly blocked by the bent-around rim of the tubular case, and the path through the feedthrough opening is blocked by the feedthrough itself. Even if the feedthrough were fixed to the elastomer solely in the manner of riveting, and does not touch the metal disk for reasons of electrical insulation, only a minute ring remains as an evaporation surface at the outside of the sealing means.

Therefore, the sealing means of the invention evinces the same permeability suppression as known disks, while on the other hand and at the same time, with respect to said known disks, and contrary to what applies to them, it offers problem-free and non-critical assembly and the same superior sealing properties as the plugs. As the actual radial sealing with the tubular case no longer need take place in the region of the metal disk, the reduction in case diameter—which determines the sealing compression—can be made substantially higher in the sealing region, for instance by rolling-in a pleat, which clearly radially constricts the plug-shaped elastomer part underneath the metal disk.

The sealing means so designed also can be used to seal tubular cases of relatively large diameters because the metal disk solidly joined to the elastomer part imparts to this plug-shaped elastomer part the required strength against flexure and cambering.

In order to achieve these advantages, the elastomer part must be at least twice as thick in the axial direction as the disk, preferably at least four times, especially at least six times, in order to impart to the sealing means the nature of an elastomer plug as intended.

Furthermore, the diameter of the at least one aperture provided in the metal disk for the electrical feedthrough preferably exceeds the diameter of the coaxial bore provided in the elastomer part for the electrical feedthrough. Such an arrangement ensures an adequately high radial elastic sealing stress around the feedthrough element which usually will be shaped like a rivet or a wire, once it is inserted. Upon sufficient widening of the passage bore in the elastomer, large return forces for achieving adequate sealing between the elastomer part and the feedthrough element can be achieved, so the feedthrough element can still be selected to be less in diameter than the diameter of the aperture in the metal disk, whereby the electric feedthrough can be designed to be insulated electrically with respect to the metal disk without requiring special additional insulation.

As already explained above, the means consisting of a solid compound element consisting of the elastomer part and the metal disk can be manufactured by bonding, fusing or other joining techniques. Preferably, however, the two elements are joined by injection-mold coating the elastomer in the non-crosslinked state, as an elastomer molding material in a mold around the metal disk, and then crosslinking it, i.e., vulcanizing the material on the metal disk while forming a solid compound part or element. Preferably, a molding tool will be used for coating the elastomer molding material on the metal disk, which comprises pin-shaped elements in the mold cavity that penetrate with a precise fit into the openings of the metal disk. This permits and facilitates quick and accurate adjustment of the metal disk to be placed into the mold or already in it, and simultaneously prevents the injected elastomer molding material from flowing through the apertures in the disk to its outside.

BRIEF DESCRIPTION OF THE DRAWINGS

The accompanying drawings, which are incorporated into and constitute a part of the specification, illustrate a preferred embodiment of the invention and, together with the general description of the invention given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 1:
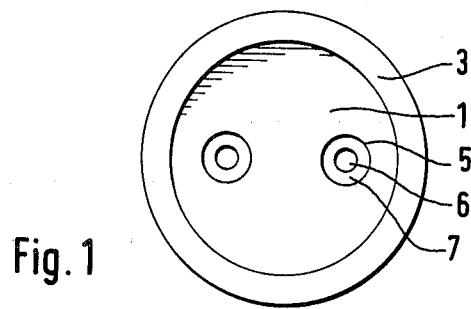
FIG. 1 is a top view of the outside of the sealing means of the embodiment.
Figure 2:
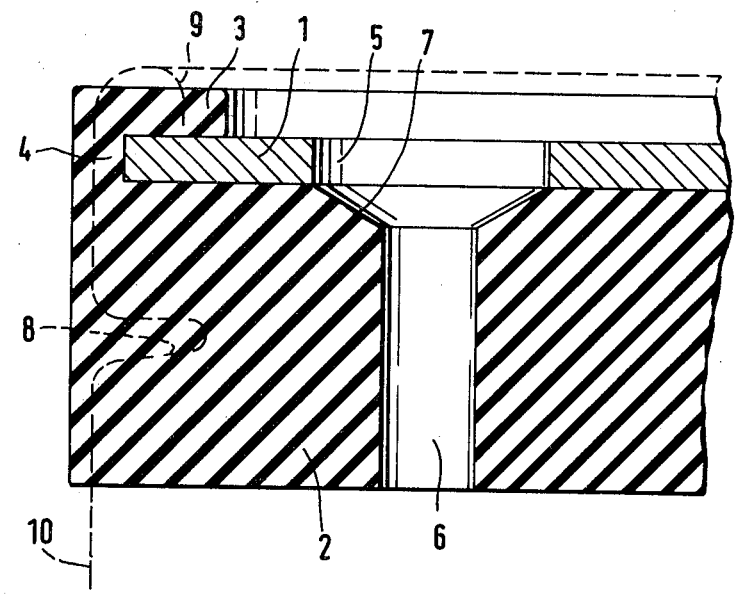
FIG. 2, is an axial section of the embodiment of FIG. 1 shown in partial and enlarged scale.

FIGS. 1 and 2 show an illustrative embodiment of the invention. A metal disk 1 is solidly joined to a rubber plug 2 of which it forms the outward face. The rubber plug 2 is provided with a flange-shaped ring 3 located around the axis and covering the outer rim area of the metal disk 1. By means of the annular fillet 4, the ring 3 is integrally joined with the main part of the plug 2.

The rubber plug 2 is vulcanized on metal disk 2 while thus forming a solid compound body. The metal disk 1 comprises an aperture 5 through it, for an electrical feedthrough, which is omitted from the figures. Coaxially with the feedthrough aperture 5 in metal disk 1, the rubber plug 2 is provided with a through-bore to seat the electrical feedthrough. The diameter of the feedthrough bore 6 clearly is shown to be less than the diameter of the feedthrough opening 5. This ensures adequate radial widening of the feedthrough bore 6 when an electrical feedthrough element with a diameter less than that of opening 5 is forced through, the diameter of said feedthrough element, however, being significantly larger than the inside diameter of bore 6 in the rest condition of the elastomer. In this manner, in spite of the use of a metallic material for disk 1, an electric feedthrough insulated with respect to the disk can be made to pass through the disk.

The opening 5 and the bore 6 merge into one another through an intermediate region 7 fashioned in the plug 2. An adjusting pin in the molding tool, with a geometry shown in female form by the conical intermediate region, facilitates the insertion of the metal disk into the molding tool. The funnel-shaped transition furthermore facilitates the insertion of an electric feedthrough into the elastomer part 2.

After an electric feedthrough has been inserted into the elastomer part 2 and after all other conventional preparations have been carried out, the sealing means is placed into the upper tubular case rim. The tubular case is then sealed in conventional manner by rolling-in at least one sealing pleat 8 and by bending over the upwardly projecting rim 9 onto ring 3. FIG. 2 shows the path of the tubular case wall 10 after sealing of the capacitor in dashed line and schematic manner.

For the sake of simple representation, the description of the invention has been restricted to a sealing means for the tubular case of an electrical capacitor. However, one skilled in the art will readily understand that such a sealing means also can be used to seal the housing of other electrical components, for instance for sealing batteries, storage batteries, resistors or other encapsulated electronic components. The descripton above of the sealing means for a capacitor tubular case also includes these other fields of application.

Furthermore, again for the sake of simplicity, the description of the invention is based on sealing means which is circular in topview. It is at once evident that the sealing means when viewed from the top, that is in the axial direction, also may be square or rectangular, with or without rounded-off corners, or oval or of other arbitrary geometric shapes. Such geometries also shall be considered included in the description above for a circular component.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or scope of applicant's general inventive concept.

I claim:

1. In a sealing means for a case of an electrical component, including a metal disk comprising at least one aperture for an electric feedthrough and one elastomer part acting as the sealing element, essentially covering completely at least the metal-disk inside facing the case inside, the improvement comprising:

the elastomer part as measured from the inside of the metal disk is at least twice as thick in the axial direction as the metal disk and furthermore prior to the intended use of the sealing means for sealing the case, the elastomer part covers and surrounds in sealing manner the radial outer rim and at least the peripheral rim region of the outside of the metal disk axially opposite the inside of the case.

2. Sealing means per claim 1, characterized in that the elastomer part is at least four times the thickness of the metal disk.

3. Sealing means per one of claim 1 or 2, characterized in that the elastomer part comprises a feedthrough bore coaxial with the feedthrough aperture in the metal disk, the feedthrough bore diameter being less than that of the feedthrough aperture.

4. Sealing means per claim 3, characterized by a conical transition region between the feedthrough aperture in the metal disk and the feedthrough bore in the elastomer part.

5. A process for manufacturing the sealing means per one of claims 1 through 4, characterized by inserting a metal disk provided with feedthrough apertures into a mold comprising adjusting pins accurately fitted to the feedthrough apertures;

by injecting or forcing upon closure of the mold a non-crosslinked elastomer molding material into the mold cavity, and by crosslinking the molded material once ejected.

* * * * *